US012236842B2

(12) United States Patent
Chen

(10) Patent No.: US 12,236,842 B2
(45) Date of Patent: Feb. 25, 2025

(54) CONTROL DEVICE AND CONTROL METHOD FOR TURNING ON DIFFERENT CHANNELS OF DISPLAY UNIT IN TIME DIVISION TO REDUCE VOLTAGE DROP

(71) Applicant: Nuvoton Technology Corporation, Hsinchu Science Park (TW)

(72) Inventor: Chih-Ming Chen, Yilan County (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 114 days.

(21) Appl. No.: 18/309,619

(22) Filed: Apr. 28, 2023

(65) Prior Publication Data

US 2023/0351942 A1 Nov. 2, 2023

(30) Foreign Application Priority Data

Apr. 29, 2022 (TW) .................................. 111116315

(51) Int. Cl.
*G09G 3/20* (2006.01)

(52) U.S. Cl.
CPC ..................... *G09G 3/2096* (2013.01); *G09G 2320/0223* (2013.01); *G09G 2370/10* (2013.01)

(58) Field of Classification Search
CPC ......... G09G 3/2096; G09G 2320/0223; G09G 2370/10; G09G 3/2092; G09G 3/20; G09G 2330/025; G09G 2330/026; G09G 3/3406; G09G 3/147
See application file for complete search history.

(56) References Cited

U.S. PATENT DOCUMENTS 6,121,949 A * 9/2000 Ramamurthy ......... G09G 5/006 345/101
2003/0048852 A1* 3/2003 Hwang .................. H04N 19/89 375/240.26
2005/0117601 A1* 6/2005 Anderson .............. H04L 65/70 370/465

(Continued)

FOREIGN PATENT DOCUMENTS

TW 202127243 A * 7/2021 ........... G06F 3/1415
WO WO-2015134203 A1 * 9/2015 ....... H04L 29/06027

*Primary Examiner* — Temesghen Ghebretinsae
*Assistant Examiner* — K. Kiyabu
(74) *Attorney, Agent, or Firm* — Muncy, Geissler, Olds & Lowe, P.C

(57) ABSTRACT

A control device for driving a display device includes a first channel having a first output device. The first output device outputs first transfer data to the first channel according to an enable signal. The first transfer data includes a preamble code and a function code. The first output device includes a preamble-code generator and a function-code generator. The preamble-code generator outputs a bit number of a predetermined value as the preamble code according to the bit number of preamble code. The bit number and the predetermined value are defined by the user. The function-code generator converts each of a function-code number of command codes into a respective bit code, and the function-code number of bit codes are output as the function code according to a lookup table. The mapping relationship between the command code and the bit code is stored in the lookup table.

20 Claims, 12 Drawing Sheets

(56) References Cited

U.S. PATENT DOCUMENTS

| | | | | |
|---|---|---|---|---|
| 2007/0064745 | A1* | 3/2007 | Zeng | H04L 7/042 370/208 |
| 2009/0303331 | A1* | 12/2009 | Yoon | G09G 3/006 348/189 |
| 2011/0254817 | A1* | 10/2011 | Chang | G09G 5/06 345/204 |
| 2014/0098119 | A1* | 4/2014 | Ju | G06T 9/00 345/555 |
| 2017/0132966 | A1* | 5/2017 | Lim | G09G 5/008 |
| 2020/0090616 | A1* | 3/2020 | Duan | G09G 3/3685 |
| 2021/0390924 | A1* | 12/2021 | Kim | G09G 3/20 |

* cited by examiner

CONTROL DEVICE AND CONTROL METHOD FOR TURNING ON DIFFERENT CHANNELS OF DISPLAY UNIT IN TIME DIVISION TO REDUCE VOLTAGE DROP

CROSS REFERENCE TO RELATED APPLICATIONS

This application claims priority of Taiwan Patent Application No. 111116315, filed on Apr. 29, 2022, the entirety of which is incorporated by reference herein.

BACKGROUND OF THE INVENTION

Field of the Invention

The disclosure is generally related to a control device of a display device and a control method, and more particularly it is related to a control device and a control method in which the user can define preamble codes and function codes and turn on different channels of display units in time division to reduce the voltage drop.

Description of the Related Art

Various interface signals can drive a backlight panel. A bi-phase mark code (BMC) is a signal interface that is used for driving a backlight panel. In different sizes of backlight driving systems, the size of an IR drop of the supply voltage of the display device will affect the overall power consumption and the clarity of the screen. Therefore, it is necessary to optimize the method of controlling the backlight panel to reduce the voltage drop of the supply voltage of the display device.

In addition, when using this transmission interface, the preamble codes or the function codes are all ways to solve how the receiving end determines the start of the message data. However, during the development process, it often happens that the designer provides the wrong k-code lookup table. In order to improve the design efficiency, it is necessary to produce a bi-phase mark code packet transmission synchronization format that can meet various applications at present, and that can meet various requirements of any system application in the future.

BRIEF SUMMARY OF THE INVENTION

The present invention proposes a control device and a control method in which the user can define preamble codes and function codes. By redefining the preamble codes and function codes, the control device and control method can be adapted to different requirements. In addition, the present invention further proposes a control device and a control method for turning on display units of different channels in time division to reduce the voltage drop. By staggering the time that different channels of different display devices receive the preamble codes and adjusting the bit-width ratio of logic 0 to logic 1, the number of display units that are turned on at the same time is reduced, thereby reducing the voltage drop on the supply voltage of the display devices.

In an embodiment, a control device for driving a display device is provided. The display device comprises a first channel. The control device comprises: a first output device. The first output device outputs first transfer data to the first channel according to an enable signal, where the first transfer data comprises a preamble code and a function code. The first output device further comprises a preamble-code generator and a function-code generator. The preamble-code generator outputs the bit number of a predetermined value as the preamble code according to the bit number of the preamble code, where the bit number and the predetermined value are defined by the user. The function-code generator converts each of a function-code number of command codes into a respective bit code. The function-code number of bit codes are output as the function code. The mapping relationship of the command codes and the bit codes is defined by the user and stored in the lookup table.

According to an embodiment of the invention, the preamble-code generator comprises a preamble-code bit-number register, a preamble-code value register, a bit counter, a preamble-code shift register, and a bit-number comparator. The preamble-code bit-number register is configured to store the bit number. The preamble-code value register is configured to store the predetermined value. The bit counter counts to generate a first count value and a first shift signal according to the enable signal and a preamble-code enable signal. The preamble-code shift register shifts the predetermined value to generate the preamble code according to the first shift signal. The bit-number comparator compares the first count value with the bit number to generate the preamble-code enable signal. When the first count value does not exceed the bit number, the preamble-code enable signal enables the bit counter to count and to generate the first shift signal. When the first count value exceeds the bit number, the preamble-code enable signal disables the bit counter, causing it to stop counting and generating the first shift signal.

According to an embodiment of the invention, the function-code generator comprises a function-code number register, a function-code register, a function-code counter, a function-code shift register, and a function-code number comparator. The function-code number register is configured to store the function-code number. The function-code register is configured to store the function-code number of command codes. When the first count value exceeds the bit number, the function-code counter counts to generate a second count value and a second shift signal. The function-code shift register sequentially outputs the command codes stored in the function-code register according to the second shift signal. The function-code number comparator compares the second count value and the function-code number to generate a function-code enable signal. The first output device further comprises a lookup table register and a lookup table comparator. The lookup table register stores the lookup table. The lookup table comparator converts the command codes into the corresponding bit codes by using the lookup table according to the function-code enable signal. When the second count value does not exceed the function-code number, the lookup table comparator converts the command codes into the respective bit codes. When the second count value exceeds the function-code number, the lookup table comparator stops receiving the command codes.

According to an embodiment of the invention, the first transfer data further comprises a data code. The first output device further comprises a bit generator. The bit generator converts one of the bit codes from the lookup table comparator into a bi-phase mark code. When one of the bit codes is at a first logic level, the bi-phase mark code is switched once every half cycle. When one of the bit codes is at a second logic level, the bi-phase mark code is switched once every cycle.

According to an embodiment of the invention, when the second count value exceeds the function-code number, the lookup table comparator receives first input data and generates the bit code corresponding to the first input data according to the lookup table, and the bit generator converts the bit code corresponding to the first input data into the bi-phase mark code as the data code.

According to an embodiment of the invention, the display device further comprises a second channel. The control device further comprises a second output device, a first delay generator, a second delay generator, a first multiplexer, and a second multiplexer. The second output device outputs second transfer data to the second channel according to the enable signal, where the second transfer data comprises the preamble code, the function code, and the data code. The second output device is identical to the first output device. The first delay generator counts a first delay time to generate a first trigger signal according to the enable signal. The first delay generator counts a first delay time to generate a first trigger signal according to the enable signal. The second delay generator counts a second delay time to generate a second trigger signal according to the enable signal. The first multiplexer provides the first transfer data to the first channel according to the first trigger signal. The second multiplexer provides the second transfer signal to the second channel according to the second trigger signal.

According to an embodiment of the invention, each of the first delay generator and the second delay generator comprises a delay counter, a delay register, and a delay comparator. The delay counter counts a first time and/or a second time according to the enable signal and a clock signal. The delay register is configured to store the first delay time or the second delay time. The delay comparator compares the first time and the first delay time to generate the first trigger signal, or compares the second time and the second delay time to generate the second trigger signal. When the first time is equal to the first delay time, the delay comparator generates the first trigger signal. When the second time is equal to the second delay time, the delay comparator generates the second trigger signal.

According to an embodiment of the invention, each of the first output device and the second output device further comprises a bit-width register, a width counter, and a bit-width comparator. The bit-width register stores the bit-width ratio. The width counter generates a count signal according to a clock signal. The bit-width comparator generates a half bit pulse and a full bit pulse according to the bit-width ratio and the count signal. The ratio of the period of the full bit pulse to the period of the half bit pulse is the bit-width ratio.

According to an embodiment of the invention, when the bit code is at the first logic level, the bit generator generates the bi-phase mark code that is switched once every half cycle according to the half bit pulse.

According to an embodiment of the invention, when the bit code is at the second logic level, the bit generator generates the bi-phase mark code that is switched once every cycle according to the full bit pulse.

In another embodiment, a control method for driving a display device comprises the following steps. First transfer data is output to a first channel of the display device according to an enable signal, where the first transfer data comprises a preamble code and a function code. The step of outputting the first transfer data to the first channel of the display device according to the enable signal further comprises the following steps. A bit number of a predetermined value is output as the preamble code according to the bit number of the preamble code. The bit number and the predetermined value are defined by a user. A function-code number of command codes is converted into respective bit codes according to a lookup table. The function-code number of bit codes is output as the function code, where a mapping relationship of the command codes and the bit codes is defined by the user and stored in the lookup table.

According to an embodiment of the invention, the step of outputting the predetermined value of the bit number as the preamble code according to the bit number of the preamble code comprises the following steps. The bit number is stored by using a preamble-code bit-number register. The predetermined value is stored by using a preamble-code value register. When a first count value does not exceed the bit number, the first count value is increased by one and a first shift signal is generated. When the first count value exceeds the bit number, the first count value is stopped increasing and the first shift signal is stopped generating. The predetermined value is shifted to output as the preamble code according to the first shift signal.

According to an embodiment of the invention, the step of converting the function-code number of command codes into respective bit codes according to the lookup table comprises the following steps. The function-code number is stored by using a function-code number register. The function-code number of command codes is stored by using a function-code register. When the first count value exceeds the bit number, a second count value is increased by one and a second shift signal is generated. The command codes stored in the function-code register are sequentially output according to the second shift signal. When the second count value does not exceed the function-code number, the command codes are converted into the corresponding bit codes according to a lookup table.

According to an embodiment of the invention, the first transfer data further comprises a data code. The control method further comprises the following steps. The bit code is converted into a bi-phase mark code. The step of converting the bit code into the bi-phase mark code further comprises the following steps. When the bit code is at a first logic level, the bi-phase mark code is switched once every half cycle. When the bit code is at a second logic level, the bi-phase mark code is switched once every cycle.

According to an embodiment of the invention, the control method further comprises the following steps. When the second count value exceeds the function-code number, first input data is received. The bit code corresponding to the first input data is generated according to the lookup table, where the bit code corresponding to the bi-phase mark code is output as the data code.

According to an embodiment of the invention, the control method further comprises the following steps. Second transfer data is output to a second channel of the display device, where the second transfer data comprises the preamble code, the function code, and the data code. A first delay time and a second delay time are counted to generate a first trigger signal and a second trigger signal respectively according to the enable signal. The first transfer data is provided to the first channel according to the first trigger signal. The second transfer data is provided to the second channel according to the second trigger signal.

According to an embodiment of the invention, the step of counting the first delay time and the second delay time to generate the first trigger signal and the second trigger signal respectively according to the enable signal further comprises the following steps. The first delay time and the second delay time are stored by using a delay register. A first time and a second time are counted according to the enable signal and a clock signal. When the first time is equal to the first delay time, the first trigger signal is generated. When the second time is equal to the second delay time, the second trigger signal is generated.

According to an embodiment of the invention, in the step of providing the first transfer data to the first channel according to the first trigger signal, and in the step of providing the second transfer data to the second channel according to the second trigger signal, the following steps are performed. A bit-width ratio is stored in the bit-width register. A count signal is generated according to a clock signal. A half bit pulse and a full bit pulse are generated according to the bit-width ratio and the count signal, where a ratio of a period of the full bit pulse to a period of the half bit pulse is the bit-width ratio.

According to an embodiment of the invention, the step of switching the bi-phase mark code once every half cycle further comprises the following step. When the bit code is at the first logic level, the bi-phase mark code that is switched once every half cycle is generated using the half bit pulse.

According to an embodiment of the invention, wherein the step of switching the bi-phase mark code once every cycle further comprises the following step. When the bit code is at the second logic level, the bi-phase mark code that is switched once every cycle is generated using the full bit pulse.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
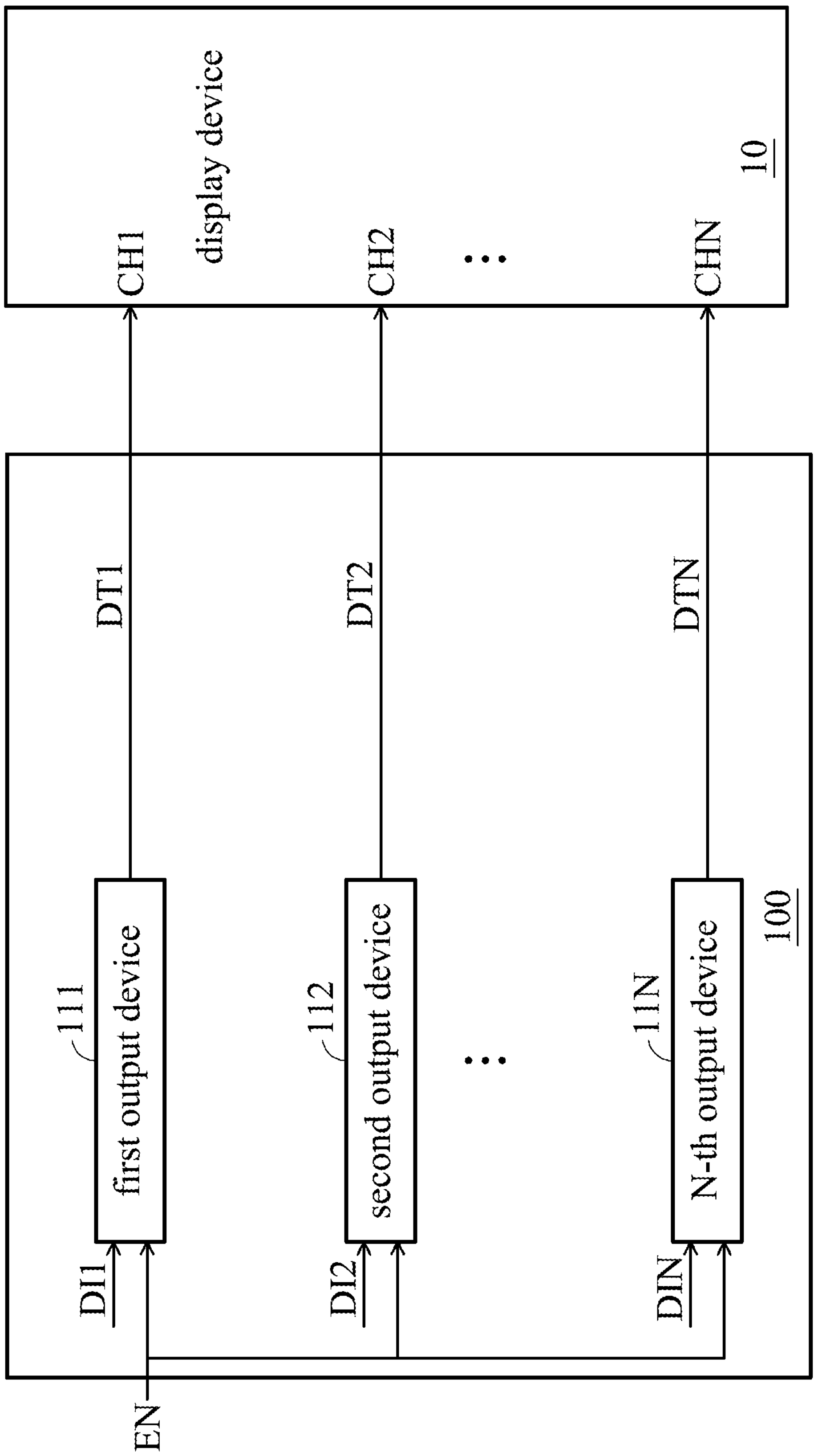
FIG. 1 is a block diagram of a control device in accordance with an embodiment of the present invention.

The following description is made for the purpose of illustrating the general principles of the disclosure and should not be taken in a limiting sense. The scope of the disclosure is determined by reference to the appended claims.

In the following detailed description, for purposes of explanation, numerous specific details and embodiments are set forth in order to provide a thorough understanding of the present disclosure. The use of like and/or corresponding numerals in the drawings of different embodiments does not suggest any correlation between different embodiments.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In addition, in this specification, relative spatial expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section in the specification could be termed a second element, component, region, layer, portion or section in the claims without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "approximately", "about" and "substantially" typically mean a value is within a range of +/−20% of the stated value, more typically a range of +/−10%, +/−5%, +/−3%, +/−2%, +/−1% or +/−0.5% of the stated value. The stated value of the present disclosure is an approximate value. Even there is no specific description, the stated value still includes the meaning of "approximately", "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In the drawings, similar elements and/or features may have the same reference number. Various components of the same type can be distinguished by adding letters or numbers after the component symbol to distinguish similar components and/or similar features.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

FIG. 1 is a block diagram of a control device in accordance with an embodiment of the present invention. As shown in FIG. 1, the control device 100 is coupled to the display device 10, where the display device 10 includes a first channel CH1, a second channel CH2 . . . and an Nth channel CHN. According to some embodiments of the present invention, the first channel CH1, the second channel CH2 . . . and the Nth channel CHN each includes at least one display unit.

The control device 100 includes a first output device 111, a second output device 112 . . . and an Nth output device 11N. The first output device 111, the second output device 112 . . . and the Nth output device 11N convert the first input data DI1, the second input data DI2 . . . and the Nth input data DIN into the first transfer data DT1, the second transfer data DT2 . . . and the Nth transfer data DTN respectively. In addition, the first transfer data DT1, the second transfer data DT2 . . . and the Nth transfer data DTN are provided to the corresponding first channel CH1, second channel CH2 . . . and N-th channel CHN respectively.

Figure 2:
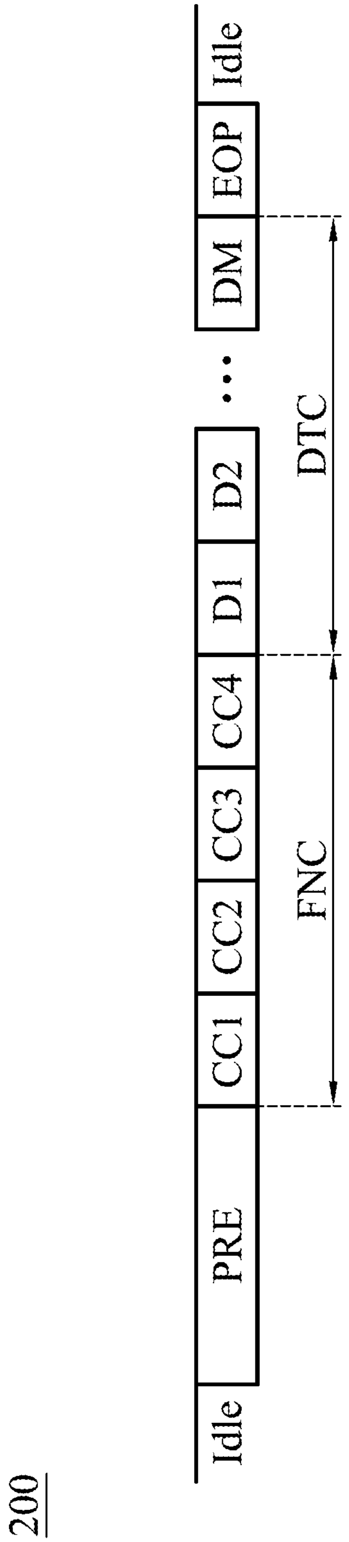
FIG. 2 is a schematic diagram illustrating transfer data in accordance with an embodiment of the present invention.

FIG. 2 is a schematic diagram illustrating transfer data in accordance with an embodiment of the present invention. As shown in FIG. 2, the transfer data 200 includes a preamble code PRE, a function code FNC, a data code DTC, and an end-of-packet EOP. According to an embodiment of the present invention, the transfer data 200 corresponds to any one of the first transfer data DT1, the second transfer data DT2 . . . and the Nth transfer data DTN in FIG. 1. The preamble code PRE is configured to initially set the display units of the first channel CH1, the second channel CH2 . . . or the Nth channel CHN of the display device 10 in FIG. 1.

The function code FNC includes a first command code CC1, a second command code CC2, a third command code CC3, and a fourth command code CC4. According to an embodiment of the present invention, the first command code CC1, the second command code CC2, the third command code CC3, and the fourth command code CC4 are configured to set the synchronization format of the control device 100 and the display device 10.

The data code DTC includes the first data D1, the second data D2 . . . and the Mth data DM, where the first data D1, the second data D2 . . . and the M-th data DM are configured to transmit the control data for controlling the respective display unit. The end-of-Packet EOP is configured to indicate the end of transmission.

According to an embodiment of the present invention, before the preamble code PRE and after the end of the packet EOP, the transfer data 200 is in the idle state Idle. As shown in the embodiment of FIG. 2, the transfer data 200 is at a high logic level in the idle state Idle. According to another embodiment of the present invention, the transfer data 200 may also be at a low logic level in the idle state Idle.

Figure 3:
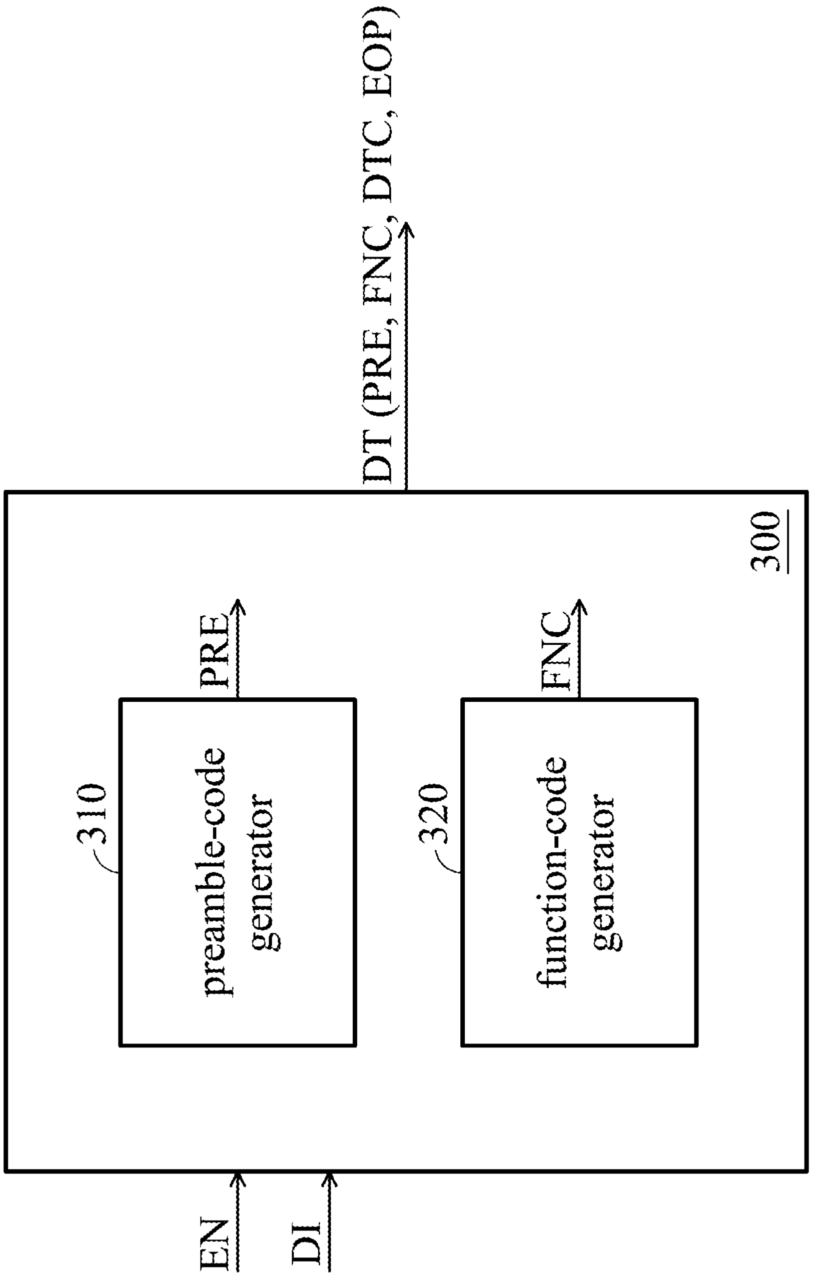
FIG. 3 is a block diagram of an output device in accordance with an embodiment of the present invention.

FIG. 3 is a block diagram of an output device in accordance with an embodiment of the present invention. As shown in FIG. 3, the output device 300 includes a preamble-code generator 310 and a function-code generator 320. According to an embodiment of the present invention, the output device 300 corresponds to the first output device 111, the second output device 112 . . . and the N-th output device 11N in FIG. 1.

The preamble-code generator 310 is configured to generate the preamble code PRE, and the function-code generator 320 is configured to generate the function code FNC. The output device 300 converts the input data DI into a data code DTC and sequentially outputs the preamble code PRE, the function code FNC, the data code DTC, and the end of packet EOP as the transfer data DT. According to an embodiment of the present invention, the function code FNC, the data code DTC, and the end-of-packet EOP are bi-phase mark codes.

According to an embodiment of the present invention, the input data DI in FIG. 3 corresponds to one of the first input data DI1, the second input data DI2 . . . and the N-th input data DIN in FIG. 1, the transfer data DT in the FIG. 3 corresponds to one of the first transfer data DT1, the second transfer data DT2 . . . and the N-th transfer data DTN in FIG. 1. It will be described in detail in the following paragraphs that how to generate the preamble code PRE, the function code FNC, and the data code DTC.

Figure 4:
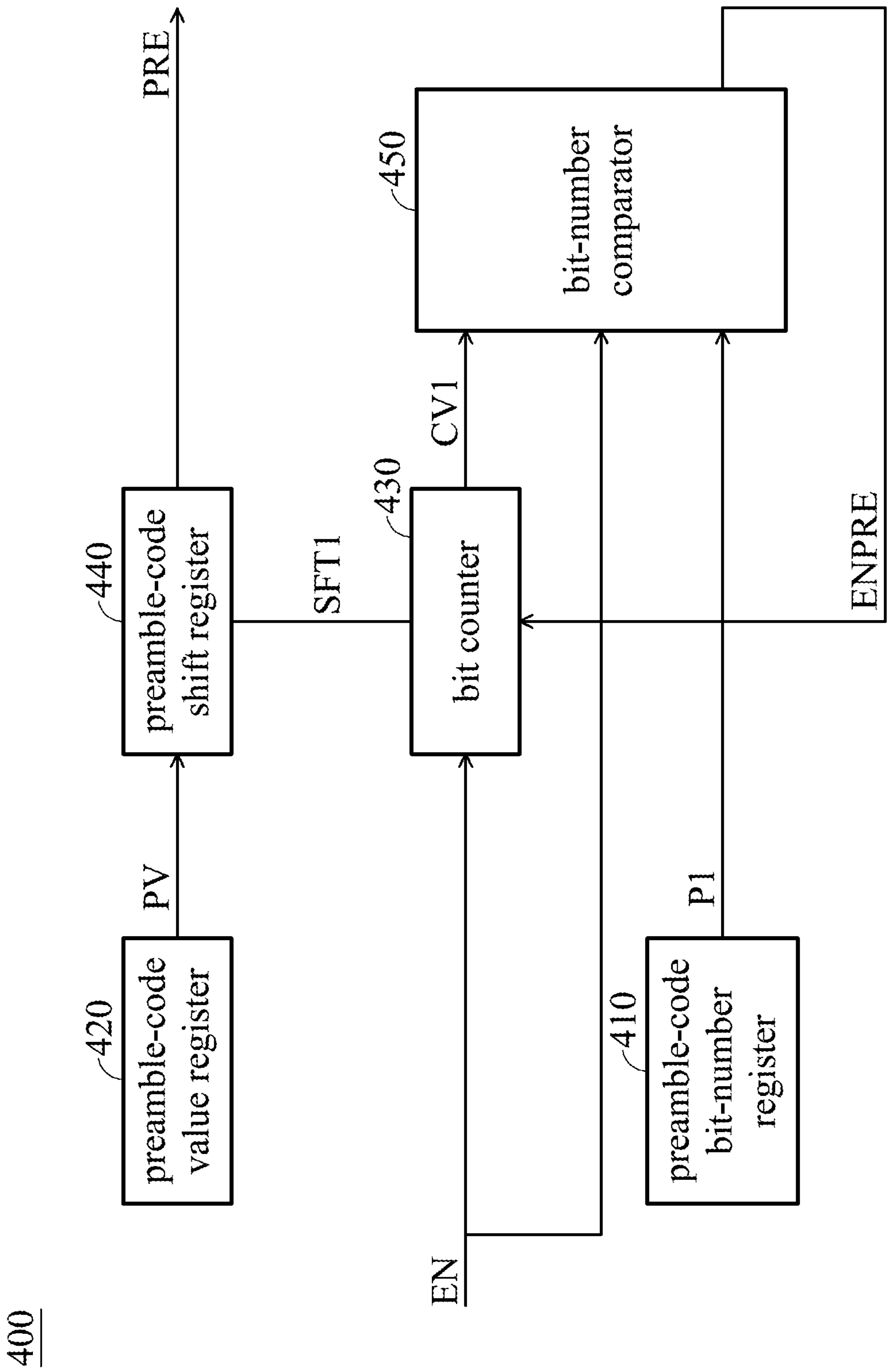
FIG. 4 is a block diagram of a preamble-code generator in accordance with an embodiment of the present invention.

FIG. 4 is a block diagram of a preamble-code generator in accordance with an embodiment of the present invention. As shown in FIG. 4, the preamble-code generator 400 includes a preamble-code bit-number register 410, a preamble-code value register 420, a bit counter 430, a preamble-code shift register 440, and a bit-number comparator 450.

The preamble-code bit-number register 410 is configured to store the bit number P1 of the preamble code PRE, and the preamble-code value register 420 is configured to store a predetermined value PV. According to some embodiments of the present invention, the preamble-code value register 420 stores a predetermined value PV corresponding to the bit number P1. The bit counter 430 counts according to the enable signal EN and the preamble-code enable signal ENPRE to generate a first count value CV1 and a first shift signal SFT1. According to an embodiment of the present invention, the enable signal EN is equal to the enable signal EN in FIG. 1.

According to one embodiment of the present invention, when the idle state Idle is a high logic level and the preamble-code shift register 440 first outputs the least significant bit (LSB), the predetermined value PV is 0xAA, in order to generate the most number of logic transitions. According to another embodiment of the present invention, when the idle state Idle is a high logic level and the preamble-code shift register 440 first outputs the most significant bit (MSB), the predetermined value PV is 0x55, in order to generate the most number of logical transitions.

According to yet another embodiment of the present invention, when the idle state Idle is a low logic level and the preamble-code shift register 440 first outputs the least significant bit (LSB), the predetermined value PV is 0x55. According to yet another embodiment of the present invention, when the idle state Idle is a low logic level and the preamble-code shift register 440 first outputs the most significant bit (MSB), the predetermined value PV is 0xAA.

According to other embodiments of the present invention, the predetermined value PV may be other values as well, and 0x55 and 0xAA are merely illustrated for explanation, but not intended to be limited thereto.

The preamble-code shift register 440 shifts the predetermined value PV and outputs it as the preamble-code PRE according to the first shift signal SFT1. The bit-number comparator 450 compares the first count value CV1 with the bit number P1 to generate a preamble-code enable signal ENPRE.

When the first count value CV1 does not exceed the bit number P1, the preamble-code enable signal ENPRE is at the first logic level, so as to enable the bit counter 430 to continue counting. When the first count value CV1 exceeds the bit number P1, the preamble-code enable signal ENPRE is at the second logic level and disables bit counter 430 to stop counting.

For example, it is assumed that the bit number P1 is 32, it indicates that the preamble code PRE in FIG. 2 has 32 bits. The bit counter 430 starts counting to output a first count value CV1 and a first shift signal SFT1 according to the enable signal EN, and the bit number comparator 450 compares the first count value CV1 with the bit number P1.

When the first count value CV1 does not exceed the bit number P1, the bit number comparator 450 controls the bit counter 430 to continue counting by using the preamble-code enable signal ENPRE. The preamble-code shift register 440 outputs the most significant bit or the least significant bit of the predetermined value PV stored in the preamble-code value register 420 as the preamble code PRE according to the first shift signal SFT1 generated by the bit counter 430.

When the first count value CV1 exceeds the bit number P1 (in this embodiment, the first count value CV1 is 33, and the bit number P1 is 32), the bit-number comparator 450 controls the bit counter 430 to stop counting by using the preamble-code enable signal ENPRE.

According to an embodiment of the present invention, since the preamble-code value register 420 stores the predetermined value PV corresponding to the bit number P1, the preamble-code shift register 440 stops outputting the preamble code PRE after each bit output from the preamble-code value register 420 is completed. According to another embodiment of the present invention, when the bit counter 430 stops counting according to the preamble-code enable signal ENPRE, the bit counter 430 stops generating the first shift signal SFT1 at the same time.

Figure 5:
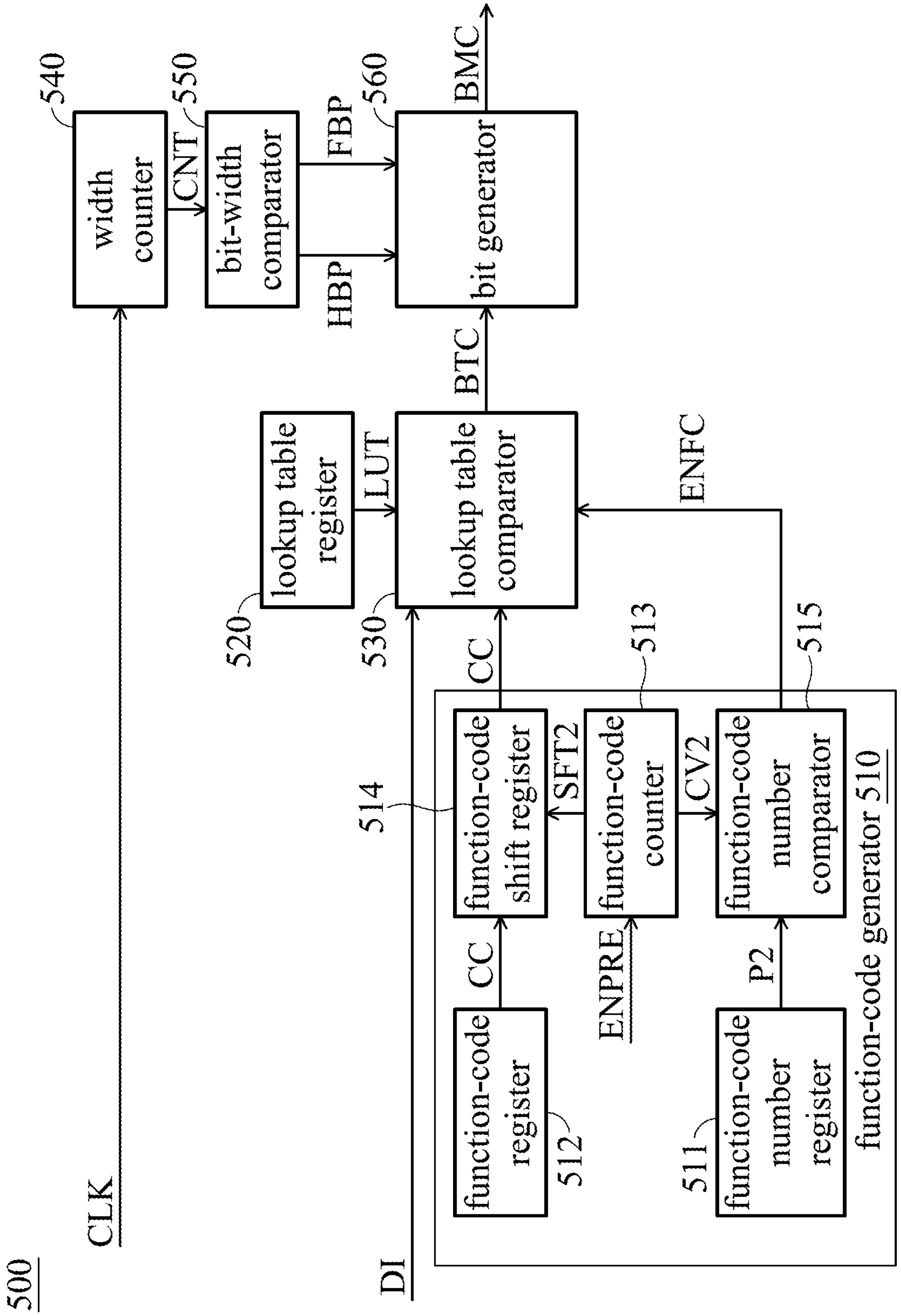
FIG. 5 is a block diagram of an output device in accordance with an embodiment of the present invention.

FIG. 5 is a block diagram of an output device in accordance with an embodiment of the present invention. As shown in FIG. 5, the output device 500 includes a function-code generator 510, a lookup table register 520, and a lookup table comparator 530. According to one embodiment of the present invention, the output device 500 in combination with the preamble-code generator 400 in FIG. 4 corresponds to one of the first output device 111, the second output device 112 . . . and the N-th output device 11N in FIG. 1.

As shown in FIG. 5, the function-code generator 510 includes a function-code number register 511, a function-code register 512, a function-code counter 513, a function-code shift register 514, and a function-code number comparator 515. The function-code number register 511 is configured for storing the function-code number P2, and the function-code number register 512 is configured for storing the command code CC of the function-code number P2.

As shown in the embodiment of FIG. 2, the function code FNC includes 4 instruction codes, representing that the function-code number P2 is 4. In addition, the function-code register 512 is configured to sequentially store the first command code CC1, the second command code CC2, the third command code CC3, and the fourth command code CC4. According to some embodiments of the present invention, when the function code FNC includes Y instruction codes, the function-code number P2 stored in the function-code number register 511 is Y, and the function-code register 512 stores Y function codes in sequence.

Referring to FIG. 5, the function-code counter 513 starts counting to generate a second count value CV2 and generate a second shift signal SFT2 according to the preamble-code enable signal ENPRE generated by the bit-number comparator 450 of FIG. 4. The function-code shift register 514 sequentially outputs the instruction code CC stored in the function-code register 514 according to the second shift signal SFT2. The function-code number comparator 515 compares the second count value CV2 with the function-code number P2 to generate a function-code enable signal ENFC.

As shown in the embodiment of FIG. 2, when the second count value CV2 is 1, the function-code shift register 514 outputs the first instruction code CC1; when the second count value CV2 is 2, the function-code shift register 514 outputs the second command code CC2, and so on.

As shown in FIG. 5, the lookup table register 520 is configured to store the lookup table LUT. The lookup table comparator 530 converts the command code CC and/or the input data DI into a corresponding bit code BTC according to the function-code enabling signal ENFC and the lookup table LUT.

According to one embodiment of the present invention, when the second count value CV2 does not exceed the number of function codes P2, the lookup table comparator 530 operates in the first state according to the function-code enable signal ENFC to convert the instruction code CC into the corresponding bit code BTC.

According to another embodiment of the present invention, when the second count value CV2 exceeds the function-code number P2, the lookup table comparator 530 operates in the second state according to the function code enable signal ENFC to convert the input data DI into the corresponding bit code BTC.

As shown in FIG. 5, the output device 500 further includes a width counter 540, a bit-width comparator 550, and a bit generator 560. The width counter 540 generates a count signal CNT according to the clock signal CLK. The bit-width comparator 550 generates a half bit pulse HBP and a full bit pulse FBP according to the count signal CNT. The bit generator 560 converts the bit code BTC into a bi-phase mark code BMC.

According to one embodiment of the present invention, when the bit code BTC is logic 1, the bi-phase mark code BMC is switched once in every half cycle. When the bit code BTC is logic 0, the bi-phase mark code BMC is switched once every cycle. According to another embodiment of the present invention, when the bit code BTC is logic 0, the bi-phase mark code BMC is switched once every half cycle; when the bit code BTC is logic 1, the bi-phase mark code BMC is switched switch once per cycle.

As shown in the output device 300 of FIG. 3, the preamble-code generator 400 of FIG. 4 and the output device 500 of FIG. 5, the preamble-code generator 400 outputs the preamble code PRE according to the enabling signal EN. When the output of the preamble code PRE is completed, the output device 500 is enabled to output the function code FNC through the preamble-code enable signal ENPRE. When the output of the function code FNC is completed, the output device 500 outputs the input data DI as a data code DTC according to the function code enable signal ENFC, where the function code FNC and the data code DTC are bi-phase mark codes BMC.

According to an embodiment of the present invention, when the transmission of the data code DTC is completed, the output device 500 further outputs the end of packet EOP, where the end of packet EOP is a bi-phase mark code BMC. In other words, the function code FNC, the data code DTC, and the packet end EOP of the transfer data DT output by the output device 300 are all bi-phase mark codes BMC except for the preamble code PRE.

Referring to FIG. 5, when the designer provides a wrong function code lookup table or wants to change the design, he can modify the instruction code CC stored in the function-code register 512 and the code stored in the lookup table register 520 to meet the requirements. In addition, the user can also modify the function-code number P2 stored in the function-code number register 511, the command code CC stored in the function-code register 512, and the lookup table LUT stored in the lookup table register 520 to meet various requirements.

Figure 6:
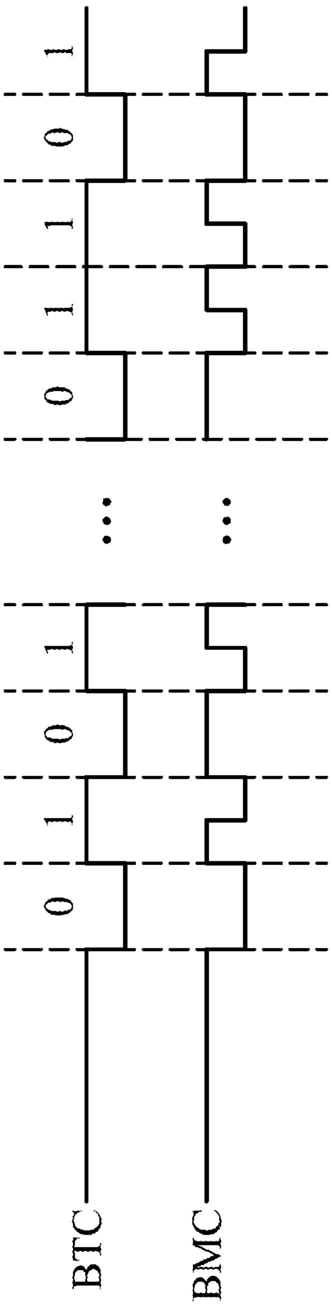
FIG. 6 is a diagram illustrating the relationship between the bit code and the bi-phase mark code in accordance with an embodiment of the present invention.

FIG. 6 is a diagram illustrating the relationship between the bit code and the bi-phase mark code in accordance with an embodiment of the present invention. According to an embodiment of the present invention, the bit code BTC in FIG. 6 corresponds to the bit code BTC in FIG. 5, and the bi-phase mark code BMC corresponds to the bi-phase mark code BMC in FIG. 5.

As shown in FIG. 6, the bit code BTC is a combination of logic 0 and logic 1. When the bit code BTC is logic 0, the bi-phase mark code BMC is switched once per cycle. When the bit code BTC is logic 1, the bi-phase mark code BMC is switched every half cycle.

According to another embodiment of the present invention, when the bit code BTC is a logic 0, the bi-phase mark code BMC is switched once every half cycle. When the bit code BTC is a logic 1, the bi-phase mark code BMC is switched once every cycle. The embodiment shown in FIG. 6 is for illustrative purposes and is not intended to be limited thereto.

Figure 7:
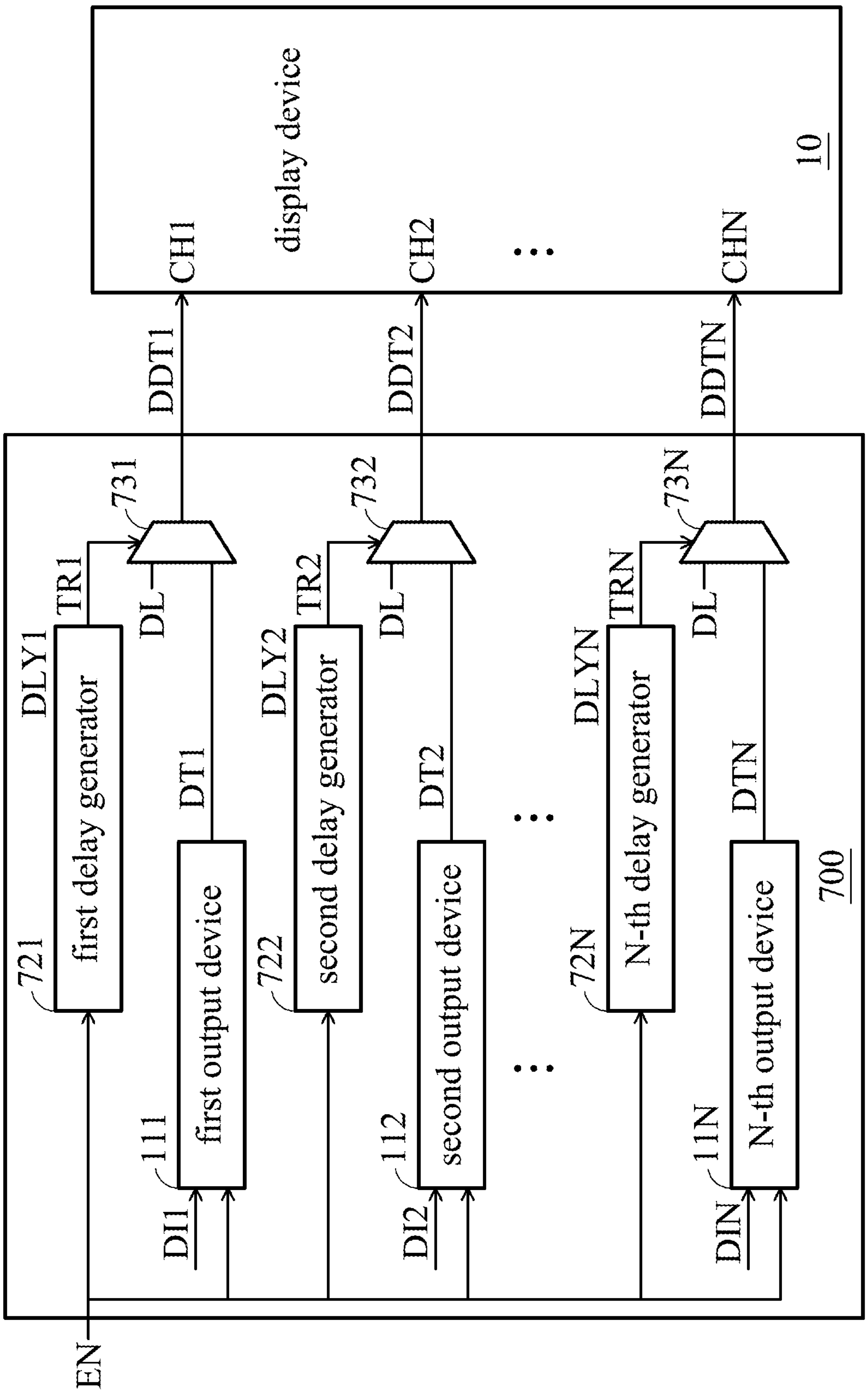
FIG. 7 is a block diagram of a control device in accordance with another embodiment of the present invention.

FIG. 7 is a block diagram of a control device in accordance with another embodiment of the present invention. Comparing the control device 700 in FIG. 7 with the control device 100 in FIG. 1, the control device 700 further includes a first delay generator 721, a second delay generator 722 . . . an N-th delay generator 72N, a first multiplexer 731, the second multiplexer 732 . . . and an N-th multiplexer 73N.

The first delay generator 721, the second delay generator 722 . . . and the N-th delay generator 72N count the first delay time DLY1, the second delay time DLY2 . . . and the N-th delay DLYN according to the enable signal EN to generate the first trigger signal TR1, the second trigger signal TR2 . . . and the Nth trigger signal TRN, respectively.

According to one embodiment of the present invention, the first multiplexer 731, the second multiplexer 732 . . . and the N-th multiplexer 73N provides the first transfer data DT1, the second transfer data DT2 . . . and the N-th transfer data DTN to the corresponding first channel CH1, the second channel CH2 . . . and the N-th channel CHN as the first delayed transfer data DDT1, the second delayed transfer data DDT2 . . . and the N-th delayed transfer data DDTN according to the first trigger signal TR1, the second trigger signal TR2 . . . and the N-th trigger signal TRN, respectively.

According to another embodiment of the present invention, when any one of the first delay generator 721, the second delay generator 722 . . . and the N-th delay generator 72N has not counted to the first delay time DLY1, the second delay time DLY2 . . . and the Nth delay time DLYN, the corresponding first trigger signal TR1, second trigger signal TR2 . . . and the N-th trigger signal TRN is not generated.

In other words, after the first transfer data DT1, the second transfer data DT2 and the N-th transfer data DTN are respectively delayed by the first delay time DLY1, the second delay time DLY2 . . . and the N-th delay time DLYN and then provided to the corresponding first channel CH1, second channel CH2 . . . and N-th channel CHN.

According to an embodiment of the present invention, when any one of the first delay generator 721, the second delay generator 722 . . . and the N-th delay generator 72N has not counted to the first delay time DLY1, the second delay time DLY2 . . . and the N-th delay time DLYN, the corresponding one of the first multiplexer 731, the second multiplexer 732 . . . and the N-th multiplexer 73N provides the default logic level DL to the corresponding one of the first channel CH1, the second channel CH2 . . . and the N-th channel CHN. According to an embodiment of the present invention, the default logic level DL may be a high logic level. According to another embodiment of the present invention, the default logic level DL may be a low logic level.

According to one embodiment of the present invention, the first delay generator 721, the second delay generator 722 . . . and the N-th delay generator 72N are different from one another, and the first delay time DLY1, the second delay time DLY2 . . . and the N-th delay times DLYN are different from one another.

According to another embodiment of the present invention, at least two of the first delay generator 721, the second delay generator 722 . . . and the N-th delay generator 72N are the same, and at least two of the first delay time DLY1, the second delay time DLY2 . . . and the N-th delay time DLYN are the same.

In other words, the first predetermined number of output devices share the first delay time generated by the first delay generator, and the second predetermined number of output devices share the second delay time generated by the second delay generator. The embodiment shown in FIG. 7 is configured for illustration and explanation herein, and is not intended to be limited thereto.

Figure 8:
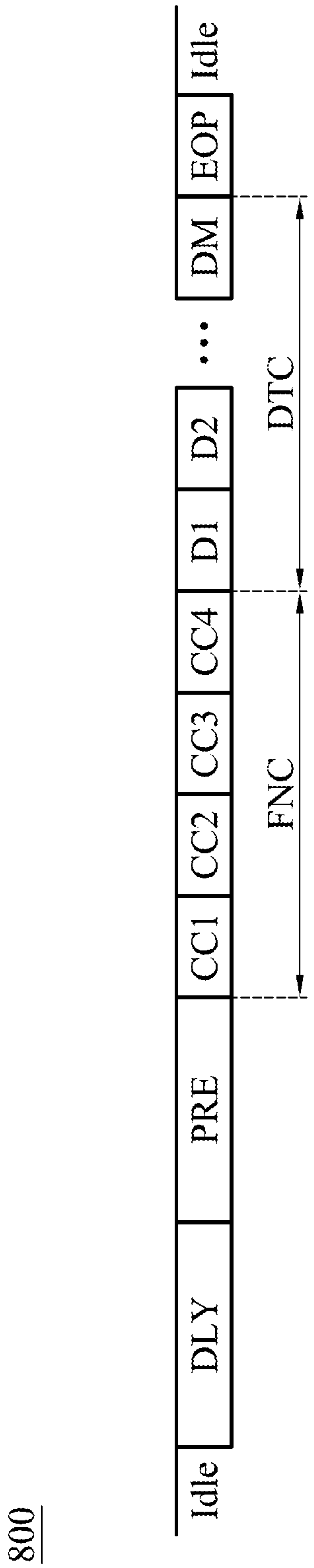
FIG. 8 is a schematic diagram illustrating delay transfer data in accordance with the embodiment in FIG. 7 of the present invention.

FIG. 8 is a schematic diagram illustrating delay transfer data in accordance with the embodiment in FIG. 7 of the present invention. Comparing the delay transfer data 800 in FIG. 8 with the transfer data 200 in FIG. 2, the delay transfer data 800 further includes a delay time DLY prior to the preamble code PRE.

According to one embodiment of the present invention, the delay transfer data 800 corresponds to the first delayed transfer data DDT1, the second delayed transfer data DDT2 . . . and the N-th delayed transfer data DDTN in FIG. 7, where the delay time DLY corresponds to the first delay time DLY1, the second delay time DLY2 . . . and the N-th delay time DLYN in FIG. 7. In other words, the delayed transfer data 800 starts to provide the preamble code PRE after a delay time DLY, compared to the transfer data 200.

In addition, as in the embodiment shown in FIG. 7, the first transfer data DT1, the second transfer data DT2 . . . and the N-th transfer data DTN are respectively delayed by the first delay time DLY1, the second delay time DLY2 . . . and the N-th delay time DLYN (corresponding to the delayed transfer data 800 in FIG. 8), and then the corresponding preamble code PRE is provided to the corresponding first channel CH1, second channel CH2 . . . and N-th channel CHN.

Figure 9:
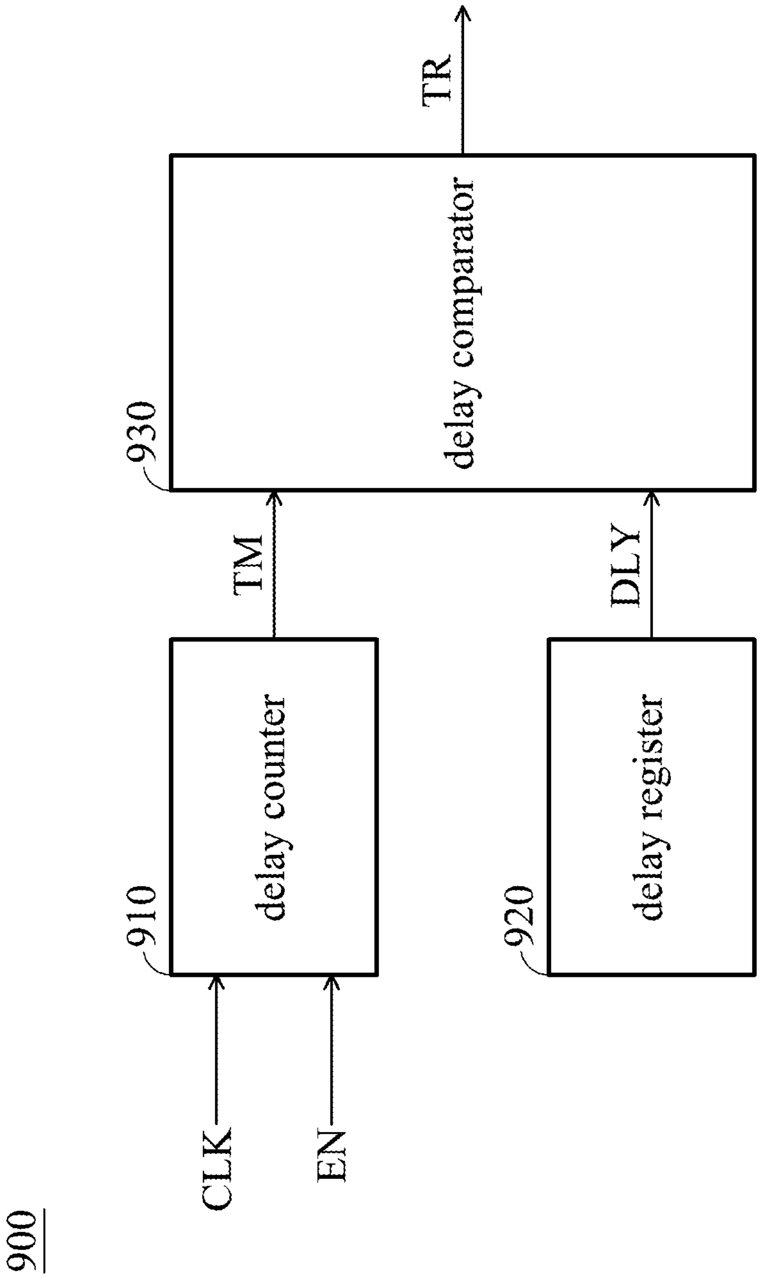
FIG. 9 is a block diagram of a delay generator in accordance with an embodiment of the present invention.

FIG. 9 is a block diagram of a delay generator in accordance with an embodiment of the present invention. As shown in FIG. 9, the delay generator 900 includes a delay counter 910, a delay register 920 and a delay comparator 930. The delay counter 910 counts the predetermined time TM according to the enable signal EN and the clock signal CLK. The delay register 920 is configured to store the delay time DLY. The delay comparator 930 is configured to compare the predetermined time TM and the delay time DLY. According to an embodiment of the present invention, when the predetermined time TM is equal to the delay time DLY, the delay comparator 930 generates the trigger signal TR.

According to an embodiment of the present invention, the delay generator 900 corresponds to any one of the first delay generator 721, the second delay generator 722 . . . and the N-th delay generator 72N in FIG. 7. As shown in FIG. 7 and FIG. 9, the delay counter 910 of the first delay generator 721, the second delay generator 722 . . . and the N-th delay generator 72N counts a predetermined time TM according to the enable signal EN and the clock signal CLK.

When the predetermined time TM counted by the first delay generator 721 is equal to the first delay time DLY1, the first delay generator 721 generates the first trigger signal TR1; when the predetermined time TM counted by the second delay generator 722 is equal to the second delay time DLY2, the second delay generator 722 generates the second trigger signal TR2, and so on.

According to another embodiment of the present invention, the delay register 920 in FIG. 9 is configured to store the first delay time DLY1, the second delay time DLY2 . . . and the N-th delay time DLYN in FIG. 7. When the predetermined time TM counted by the delay counter 910 is equal to the first delay time DLY1, the delay comparator 930 generates the first trigger signal TR1; when the predetermined time TM counted by the delay counter 910 is equal to the second delay time DLY2, the delay comparator 930 generates the second trigger signal TR2, and so on.

Figure 10:
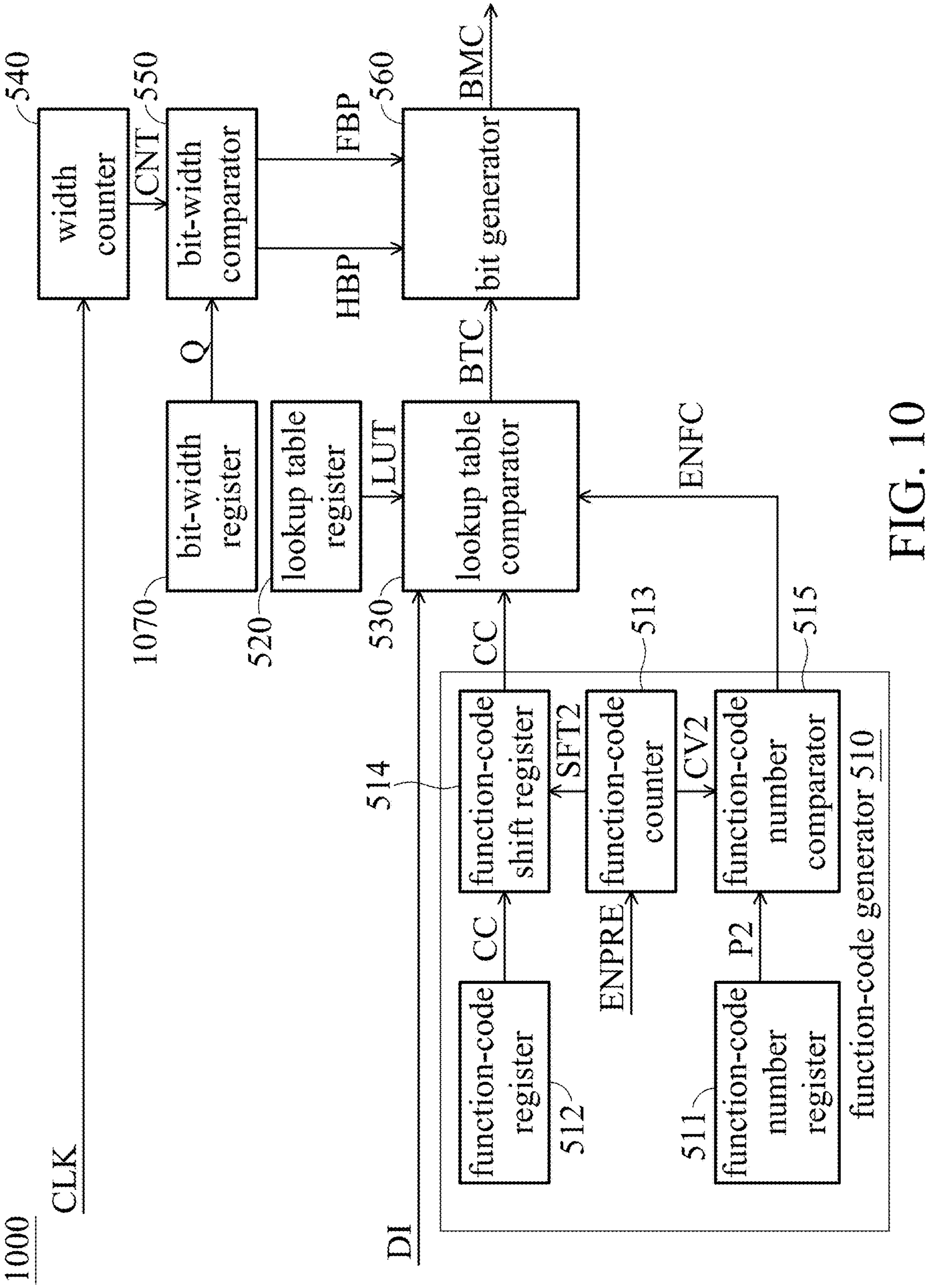
FIG. 10 is a block diagram of an output device in accordance with another embodiment of the present invention.

FIG. 10 is a block diagram of an output device in accordance with another embodiment of the present invention. Compared with the output device 500 in FIG. 5, the output device 1000 in FIG. 10 further includes a bit-width register 1070. The bit-width register 1070 stores the bit-width ratio Q, and the bit-width comparator 550 generates a half bit pulse HBP and a full bit pulse FBP according to the count signal CNT and the bit-width ratio Q. According to another embodiment of the present invention, the combination of the preamble-code generator 400 in FIG. 4 and the output device 1000 in FIG. 10 corresponds to one of the first output device 111, the second output device 112 . . . and the N-th output device 11N in FIG. 1 or FIG. 7.

Figure 11A:
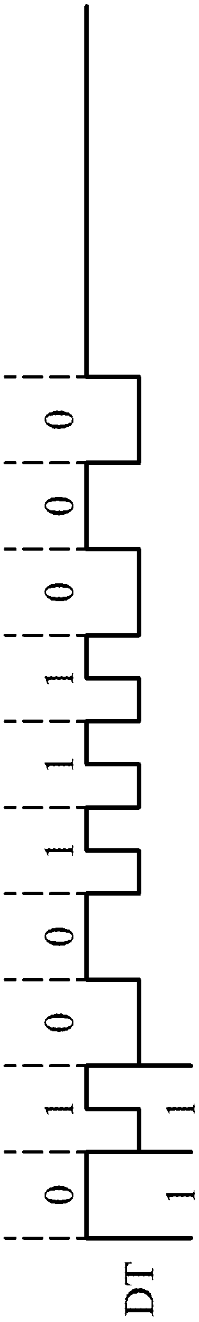
FIGS. 11A-11B show waveforms of the bi-phase mark code in accordance with the embodiment in FIG. 10 of the present invention.
Figure 11B:
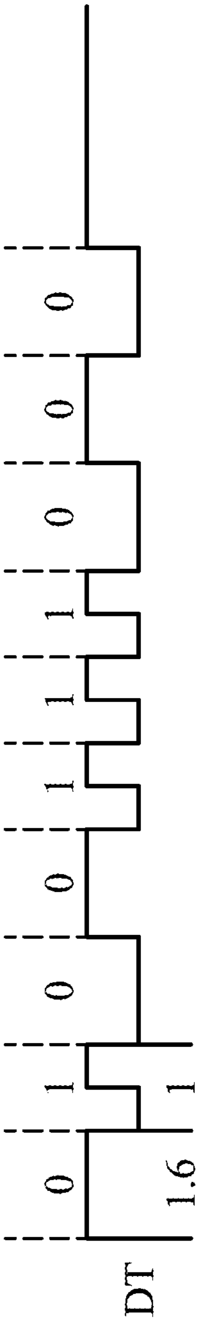

FIGS. 11A-11B show waveforms of the bi-phase mark code in accordance with the embodiment in FIG. 10 of the present invention. As shown in FIG. 11A, when the bit-width ratio Q is 1, it indicates that the bit width of logic 0 and that of logic 1 of the bi-phase mark code BMC is 1:1. Therefore, the bit width of the logic 0 of the bi-phase mark code BMC is the same as the bit width of the logic 1.

As shown in FIG. 11B, when the bit-width ratio Q is 1.6, it indicates that the bit width of the logic 0 of the bi-phase mark code BMC is 1.6 times the bit width of the logic 1. In other words, the bit width of the logic 0 of the bi-phase mark code BMC exceeds the bit width of the logic 1.

As shown in the embodiment shown in FIGS. 11A-11B, the bit width of logic 1 is fixed, and the bit-width ratio Q is configured to adjust the bit width of logic 0. According to an embodiment of the present invention, the bit-width ratio Q exceeds 1 and less than 2. According to other embodiments of the present invention, the bit width of logic 0 may be fixed, and the bit-width ratio Q is configured to adjust the bit width of logic 1.

Referring to FIG. 10, the bit-width comparator 550 in FIG. 10 adjusts the ratio of the full bit pulse FBP to the half bit pulse HBP according to the bit width ratio Q, thereby achieving the adjustment of the bit-width ratio of logic 0 to logic 1 of the bi-phase mark code BMC. According to an embodiment of the present invention, the ratio of the period of the full bit pulse FBP to the period of the half period pulse HBP is equal to the bit-width ratio Q.

Referring to FIG. 7, since to at least two of the first delay times DLY1, the second delay times DLY2 . . . and the Nth delay time DLYN are mutually different, the turn-on times of the display units on the first channel CH1, the second channel CH2 . . . and the N-th channel CHN can be staggered. In addition, the bit-width ratios Q of the first transfer data DT1, the second transfer data DT2 . . . and the N-th transfer data DTN are not equal to 1, so that the transition time of different transfer data is different. Therefore, the turn-on time of different display units can be further staggered, thereby reducing the voltage drop on the supply voltage of the display device.

Figure 12:
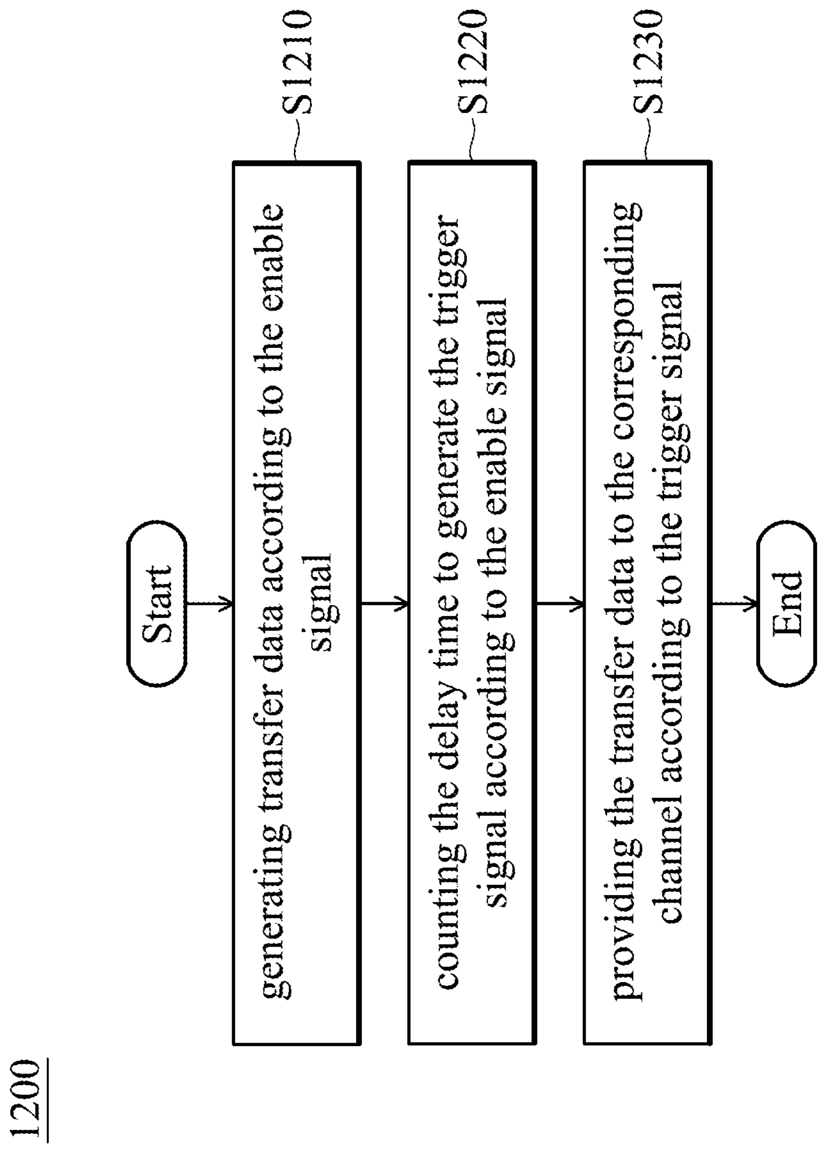
FIG. 12 is a flowchart of a control method in accordance with an embodiment of the present invention.

FIG. 12 is a flowchart of a control method in accordance with an embodiment of the present invention. The following description of the control method 1200 in FIG. 12 will be accompanied with the control device 700 in FIG. 7 for detailed description.

First, the first output device 711, the second output device 712 . . . and the N-th multiplexer 73N in FIG. 7 are utilized to generate the first transfer data DT1, the second transfer data DT2 . . . and the N-th transfer data DTN according to the enable signal EN (Step S1210).

As shown in the embodiments of FIG. 3, FIG. 4, and FIG. 5, the preamble code PRE, the function code FNC, the data code DTC and the end of the packet EOP of the transfer data DT are generated sequentially according to the enable signal EN. As shown in the embodiments of FIG. 3, FIG. 4, and FIG. 10, the bit-width ratios of logic 0 to logic 1 of the generated function code FNC, data code DTC, and the end of packet EOP are set to the bit-width ratio Q according to the enable signal EN and the bit-width ratio Q.

Referring to FIG. 12, according to the enable signal EN, the first delay generator 721, the second delay generator 722 . . . and the N-th delay generator 72N in FIG. 7 are utilized to count the first delay time DLY1, the second delay time DLY2 . . . and the N-th delay time DLYN to generate the first trigger signal TR1, the second trigger signal TR2 and the N-th trigger signal TRN respectively (Step S1220).

As shown in the embodiment of FIG. 9, the predetermined time TM is counted, and the trigger signal TR (corresponding to the first trigger signal TR1, the second trigger signal TR2 . . . and the N-th trigger signal TRN in FIG. 7) is generated when the predetermined time TM is equal to the delay time DLY (corresponding to the first delay time DLY1, the second delay time DLY2 . . . and the Nth delay time DLYN in FIG. 7).

Referring to FIG. 12, the first multiplexer 731, the second multiplexer 732 . . . and the N-th multiplexer 73N are utilized to provide the first transfer data DT1, the second transfer data DT2 . . . and the N-th transfer data DTN to the corresponding first channel CH1, second channel CH2 . . . and N-th channel CHN of the display device 10 according to the first trigger signal TR1, the second trigger signal TR2 . . . and the N-th trigger signal TRN (Step S1230).

As shown in the embodiment of FIG. 7, since the first delay generator 721, the second delay generator 722 . . . and the N-th delay generator 72N are utilized to count the first delay time DLY1, the second delay time DLY2 . . . and the N-th delay time DLYN to generate the first trigger signal TR1, the second trigger signal TR2 . . . and the N-th trigger signal TRN, the first multiplexer 731, the second multiplexer 732 . . . and the first The N-th multiplexer 73N delay the first delay time DLY1, the second delay time DLY2 . . . and the N-th delay time DLYN respectively, and then provide the first transfer data DT1, the second transfer data DT2 . . . and the N-th transfer data DTN to the first channel CH1, the second channel CH2 . . . and the N-th channel CHN respectively, so as to reduce the degree of the voltage drop on the supply voltage of the display device.

The present invention proposes a control device and a control method in which the user can define preamble codes and function codes. By redefining the preamble codes and function codes, the control device and control method can be adapted to different requirements. In addition, the present invention further proposes a control device and a control method for turning on display units of different channels in time division to reduce the voltage drop. By staggering the time that different channels of different display devices receive the preamble codes and adjusting the bit-width ratio of logic 0 to logic 1, the number of display units that are turned on at the same time is reduced, thereby reducing the voltage drop on the supply voltage of the display devices.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A control device for driving a display device, wherein the display device comprises a first channel, wherein the control device comprises:

a first output device, outputting first transfer data to the first channel according to an enable signal, wherein the first transfer data comprises a preamble code and a function code, wherein the first output device further comprises:

a preamble-code generator, outputting a bit number of a predetermined value as the preamble code according to the bit number of the preamble code, wherein the bit number and the predetermined value are defined by a user; and a function-code generator, converting each of a function-code number of command codes into a respective bit code according to a lookup table, wherein the function-code number of bit codes are output as the function code, wherein a mapping relationship of the command codes and the bit codes is defined by the user and stored in the lookup table.

2. The control device as defined in claim 1, wherein the preamble-code generator comprises:

a preamble-code bit-number register, configured to store the bit number;

a preamble-code value register, configured to store the predetermined value;

a bit counter, counting to generate a first count value and a first shift signal according to the enable signal and a preamble-code enable signal;

a preamble-code shift register, shifting the predetermined value to generate the preamble code according to the first shift signal; and a bit-number comparator, comparing the first count value with the bit number to generate the preamble-code enable signal, wherein when the first count value does not exceed the bit number, the preamble-code enable signal enables the bit counter to count and to generate the first shift signal, wherein when the first count value is greater than the bit number, the preamble-code enable signal disables the bit counter to stop counting and generating the first shift signal.

3. The control device as defined in claim 2, wherein the function-code generator comprises:

a function-code number register, configured to store the function-code number;

a function-code register, configured to store the function-code number of command codes;

a function-code counter, wherein when the first count value exceeds the bit number, the function-code counter counts to generate a second count value and a second shift signal;

a function-code shift register, sequentially outputting the command codes stored in the function-code register according to the second shift signal; and a function-code number comparator, comparing the second count value and the function-code number to generate a function-code enable signal;

wherein the first output device further comprises:

a lookup table register, storing the lookup table; and a lookup table comparator, converting the command codes into the corresponding bit codes by using the lookup table according to the function-code enable signal, wherein when the second count value does not exceed the function-code number, the lookup table comparator converts the command codes into the respective bit codes, wherein when the second count value exceeds the function-code number, the lookup table comparator stops receiving the command codes.

4. The control device as defined in claim 3, wherein the first transfer data further comprises a data code, wherein the first output device further comprises:

a bit generator, converting one of the bit codes from the lookup table comparator into a bi-phase mark code, wherein when one of the bit codes is at a first logic level, the bi-phase mark code is switched once every half cycle, wherein when one of the bit codes is at a second logic level, the bi-phase mark code is switched once every cycle.

5. The control device as defined in claim 4, wherein when the second count value exceeds the function-code number, the lookup table comparator receives first input data and generates the bit code corresponding to the first input data according to the lookup table, and the bit generator converts the bit code corresponding to the first input data into the bi-phase mark code as the data code.

6. The control device as defined in claim 4, wherein the display device further comprises a second channel, wherein the control device further comprises:

a second output device, outputting second transfer data to the second channel according to the enable signal, wherein the second transfer data comprises the preamble code, the function code, and the data code, wherein the second output device is identical to the first output device;

a first delay generator, counting a first delay time to generate a first trigger signal according to the enable signal;

a second delay generator, counting a second delay time to generate a second trigger signal according to the enable signal;

a first multiplexer, providing the first transfer data to the first channel according to the first trigger signal; and a second multiplexer, providing the second transfer data to the second channel according to the second trigger signal.

7. The control device as defined in claim 6, wherein each of the first delay generator and the second delay generator comprises:

a delay counter, counting a first time and/or a second time according to the enable signal and a clock signal;

a delay register, configured to store the first delay time or the second delay time; and a delay comparator, comparing the first time and the first delay time to generate the first trigger signal, or comparing the second time and the second delay time to generate the second trigger signal, wherein when the first time is equal to the first delay time, the delay comparator generates the first trigger signal, wherein when the second time is equal to the second delay time, the delay comparator generates the second trigger signal.

8. The control device as defined in claim 6, wherein each of the first output device and the second output device further comprises:

a bit-width register, storing a bit-width ratio;

a width counter, generating a count signal according to a clock signal; and a bit-width comparator, generating a half bit pulse and a full bit pulse according to the bit-width ratio and the count signal, wherein a ratio of a period of the full bit pulse to a period of the half bit pulse is the bit-width ratio.

9. The control device as defined in claim 8, wherein when the bit code is at the first logic level, the bit generator generates the bi-phase mark code that is switched once every half cycle according to the half bit pulse.

10. The control device as defined in claim 8, wherein when the bit code is at the second logic level, the bit generator generates the bi-phase mark code that is switched once every cycle according to the full bit pulse.

11. A control method for driving a display device, wherein the control method comprises:

outputting first transfer data to a first channel of the display device according to an enable signal, wherein the first transfer data comprises a preamble code and a function code, wherein the step of outputting the first transfer data to the first channel of the display device according to the enable signal further comprises:

outputting a bit number of a predetermined value as the preamble code according to the bit number of the preamble code, wherein the bit number and the predetermined value are defined by a user; and converting a function-code number of command codes into respective bit codes according to a lookup table;

wherein the function-code number of bit codes is output as the function code, wherein a mapping relationship of the command codes and the bit codes is defined by the user and stored in the lookup table.

12. The control method as defined in claim 11, wherein the step of outputting the predetermined value of the bit number as the preamble code according to the bit number of the preamble code comprises:

storing the bit number by using a preamble-code bit-number register;

storing the predetermined value by using a preamble-code value register;

when a first count value does not exceed the bit number, increasing the first count value by one and generating a first shift signal;

when the first count value exceeds the bit number, stopping increasing the first count value and stopping generating the first shift signal; and shifting the predetermined value to output as the preamble code according to the first shift signal.

13. The control method as defined in claim 12, wherein the step of converting the function-code number of command codes into respective bit codes according to the lookup table comprises:

storing the function-code number by using a function-code number register;

storing the function-code number of command codes by using a function-code register;

when the first count value exceeds the bit number, increasing a second count value by one and generating a second shift signal;

sequentially outputting the command codes stored in the function-code register according to the second shift signal; and when the second count value does not exceed the function-code number, converting the command codes into the corresponding bit codes according to a lookup table.

14. The control method as defined in claim 13, wherein the first transfer data further comprises a data code, wherein the control method further comprises:

converting the bit code into a bi-phase mark code, wherein the step of converting the bit code into the bi-phase mark code further comprises:

when the bit code is at a first logic level, switching the bi-phase mark code once every half cycle; and when the bit code is at a second logic level, switching the bi-phase mark code once every cycle.

15. The control method as defined in claim 14, further comprising:

when the second count value exceeds the function-code number, receiving first input data; and generating the bit code corresponding to the first input data according to the lookup table, wherein the bit code corresponding to the bi-phase mark code is output as the data code.

16. The control method as defined in claim 14, further comprising:

outputting second transfer data to a second channel of the display device, wherein the second transfer data comprises the preamble code, the function code, and the data code;

counting a first delay time and a second delay time to generate a first trigger signal and a second trigger signal respectively according to the enable signal;

providing the first transfer data to the first channel according to the first trigger signal; and providing the second transfer data to the second channel according to the second trigger signal.

17. The control method as defined in claim 16, wherein the step of counting the first delay time and the second delay time to generate the first trigger signal and the second trigger signal respectively according to the enable signal further comprises:

storing the first delay time and the second delay time by using a delay register;

counting a first time and a second time according to the enable signal and a clock signal;

when the first time is equal to the first delay time, generating the first trigger signal; and when the second time is equal to the second delay time, generating the second trigger signal.

18. The control method as defined in claim 16, wherein the step of providing the first transfer data to the first channel according to the first trigger signal and the step of providing the second transfer data to the second channel according to the second trigger signal further comprise:

storing a bit-width ratio in a bit-width register;

generating a count signal according to a clock signal; and generating a half bit pulse and a full bit pulse according to the bit-width ratio and the count signal, wherein a ratio of a period of the full bit pulse to a period of the half bit pulse is the bit-width ratio.

19. The control method as defined in claim 18, wherein the step of switching the bi-phase mark code once every half cycle further comprises:

when the bit code is at the first logic level, generating the bi-phase mark code that is switched once every half cycle using the half bit pulse.

20. The control method as defined in claim 18, wherein the step of switching the bi-phase mark code once every cycle further comprises:

when the bit code is at the second logic level, generating the bi-phase mark code that is switched once every cycle using the full bit pulse.

* * * * *